(No Model.)
H. B. SHAMP.
WHEAT STEAMER.
No. 493,225. Patented Mar. 7, 1893.
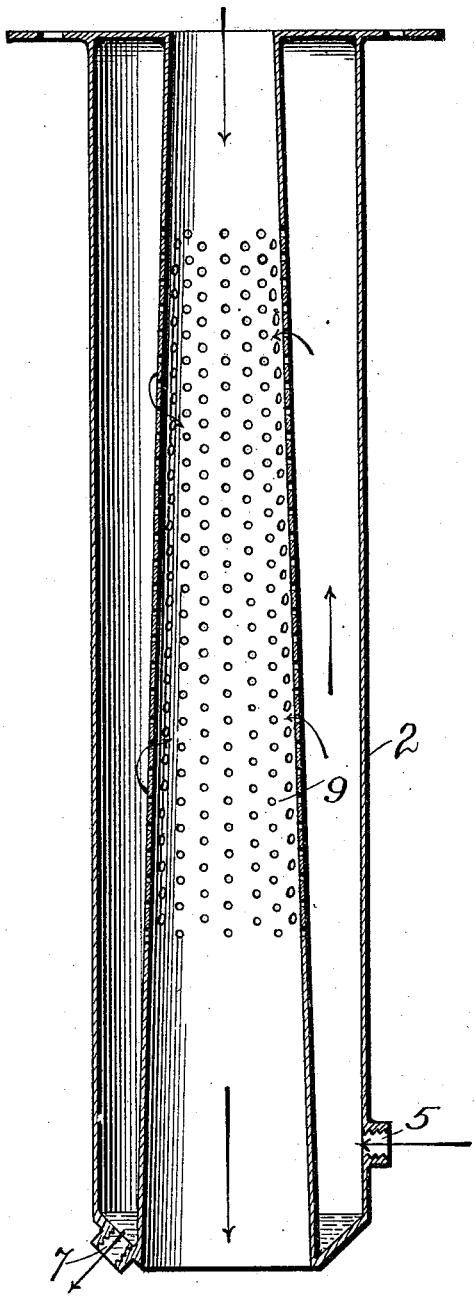
Witnesses.
J. Jessen.
O. G. Hawley.
Inventor
Henry B. Shamp,
By Paul & Morrin Attys.

UNITED STATES PATENT OFFICE.

HENRY B. SHAMP, OF MINNEAPOLIS, MINNESOTA, ASSIGNOR TO THE PETTIJOHN CALIFORNIA BREAKFAST FOOD COMPANY, OF SAME PLACE.

WHEAT-STEAMER.

SPECIFICATION forming part of Letters Patent No. 493,225, dated March 7, 1893.

Application filed May 6, 1892. Serial No. 432,069. (No model.)

*To all whom it may concern:*

Be it known that I, HENRY B. SHAMP, of Minneapolis, in the county of Hennepin and State of Minnesota, have invented certain Improvements in Wheat-Steamers, of which the following is a specification.

The object of this invention is to provide an improved device for steaming wheat designed especially for use in connection with means for rolling wheat, and the invention consists generally in a suitable casing provided with inlet and outlet pipes and having a perforated tube extending through said casing said tube being of greater diameter at the lower end than at the upper end for the purpose of allowing for the expansion of the wheat as it becomes moistened, so as to permit a free feed of the wheat in the steamer.

My invention will be more readily understood by reference to the accompanying drawing, which is a vertical sectional elevation of a device embodying my invention.

In the drawing, 2 represents a suitable casing which is provided with the inlet pipe 5 and the outlet pipe 7. This casing is of any suitable size and construction, preferably formed of metal and of cylindrical form and of any required height. Extending through this casing is a perforated tube 9 having open upper and lower ends. This tube is of considerably greater diameter at the lower end than at the upper end, so that as the wheat is fed into the device it is thoroughly saturated with the steam which is distributed through all portions of the tube, and as the wheat expands in passing through the tube the increased diameter of the lower portion of the tube permits its passage without any clogging or interruption of the feed.

The device is preferably used in connection with suitable rolls for crushing or rolling wheat and is arranged so as to have the wheat fed into the upper end and pass out through the lower end.

I claim as my invention—

The herein described wheat or grain steamer consisting of a suitable casing provided with inlet and outlet pipes, and a perforated tube extending through said casing, said tube being of greater diameter at one end than at the other for the purpose specified.

In testimony whereof I have hereunto set my hand this 2d day of May, 1892.

HENRY B. SHAMP.

In presence of—
C. G. HAWLEY,
F. S. LYON.